Figure 1:
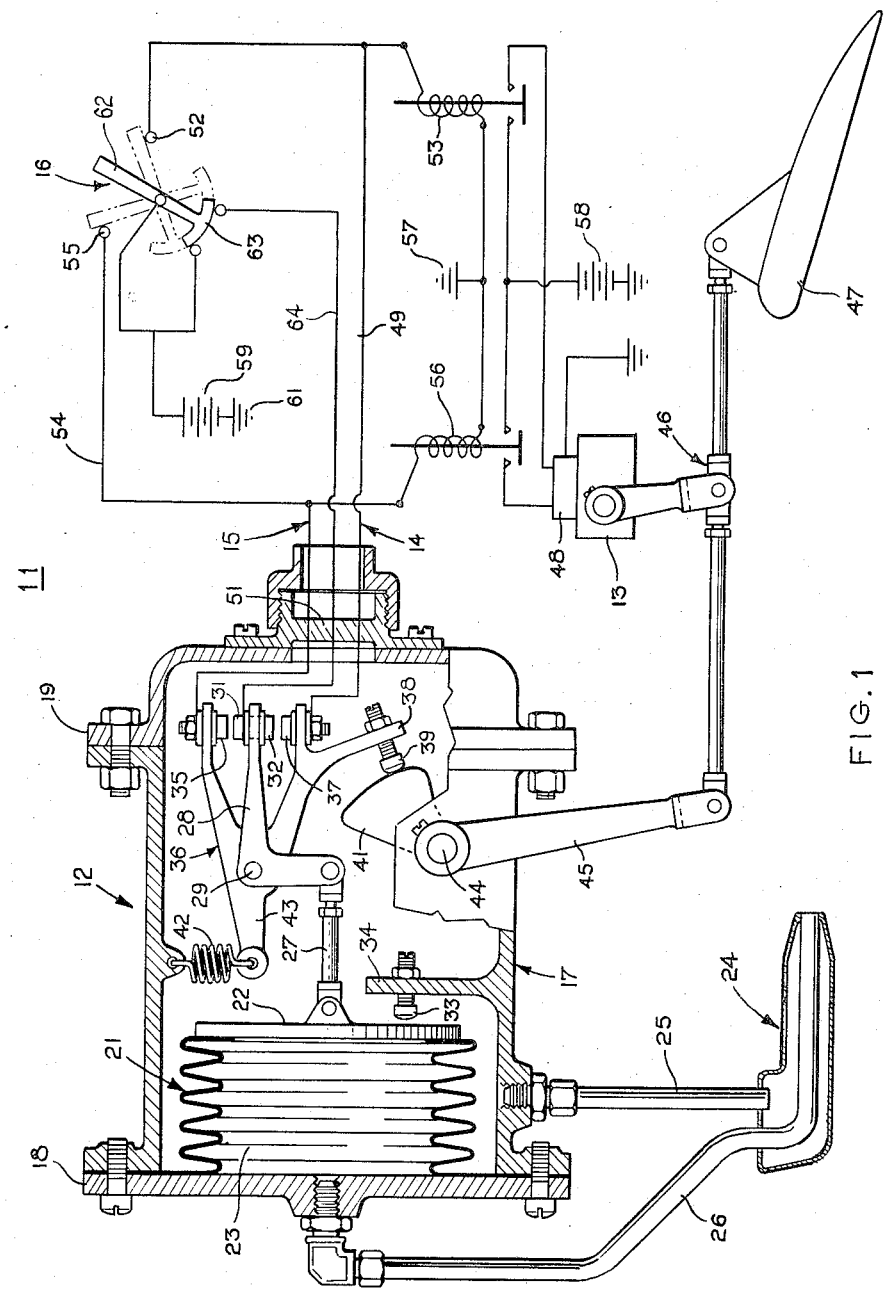

Sept. 9, 1958

R. C. FERGUSON 2,851,644

SERVO CONTROL SYSTEM FOR AIRCRAFT CONTROL SURFACES

Filed April 22, 1955

2 Sheets-Sheet 1

*INVENTOR.*
ROBERT C. FERGUSON
BY

*ATTORNEY*

INVENTOR.
ROBERT C. FERGUSON

United States Patent Office 2,851,644
Patented Sept. 9, 1958

2,851,644

SERVO CONTROL SYSTEM FOR AIRCRAFT CONTROL SURFACES

Robert C. Ferguson, Chula Vista, Calif., assignor to General Dynamics Corporation, San Diego, Calif., a corporation of Delaware Application April 22, 1955, Serial No. 503,066

10 Claims. (Cl. 318—31)

The present invention relates to control systems for aircraft control surfaces, and more particularly to a control system which automatically controls the operation of the aircraft landing flaps in response to the speed of the aircraft.

In the operation of an aircraft the pilot is generally burdened with a multitude of complex tasks requiring his complete attention, the critical landing and take-off phases being particularly demanding of his skills. In addition to his other duties the pilot is expected, on take-off for example, to operate the wing flaps to achieve optimum position at all times during the increase in speed of the aircraft. That is, the flaps should be retracted in amounts corresponding generally to the increasing aircraft speed to attain maximum rate of climb for general operational efficiency, and, when necessary, for clearing ground obstacles and dangerous terrain. On landing, the pilot should lower the flaps in amounts corresponding generally to the decreasing aircraft speed so that a desirable glide angle and landing speed may be obtained. Premature lowering of the flaps at high aircraft landing speeds is of course to be avoided, and tardy flap operation is similarly to be avoided because of the greater landing speeds which result. Finally, and perhaps most important of all, under emergencies, such as loss of power the pilot must be an astute judge of the constantly changing relation of take-off speeds to flap positions in order to obtain maximum rate of climb after take-off during the retraction of the flaps. Greater automaticity to reduce the opportunity for pilot error is thus greatly to be desired.

In accordance with the present invention the undesirable features and characteristics of the previously described manual or pilot controlled system are substantially eliminated by the provision of an automatic flap control system which operates the flaps in response to the speed of the aircraft. This system is also adapted for manual operation by the pilot in the event of malfunction of the automatic portion of the system, the system having incorporated therein certain features which readily permit such auxiliary pilot control. In the system of the present invention a pressure sensitive device serves to effect increments of change in the balance of a regulator device, the increments of change being a function of the airspeed of the airplane. The resulting unbalance in the regulator initiates the actuation of a flap drive which causes movement of the flap upwardly for increases in airspeed, and downwardly for decreases in airspeed. This flap movement is transmitted through a follow-up system to the follow-up member of the regulator, and this member serves to bring the regulator back into balance in correspondence with the movement of the flap. It is noted that the system of the present invention may be so adjusted that flap extension can only be accomplished below a desired maximum airspeed, and flap retraction can only be accomplished above a desired minimum airspeed. In this manner, improved operational efficiency of the aircraft is achieved, and taking off without flaps, landing without flaps, lowering the flaps at undesirably high airspeeds, and retracting the flaps at undesirably low airspeeds is substantially prevented. In addition, the automatic control system of the present invention is compact, comparatively simple in operation and economical to manufacture.

Accordingly, it is an object of the present invention to provide an improved control system for aircraft control sufaces which is adapted to effect changes in the position of the control surfaces in response to changes in airspeed of the aircraft.

Another object of the invention resides in the provision of a unique flap control system which is adapted to change the position of the airplane flaps as function of the speed of the aircraft and in response to the total head pressure developed in the flight of the aircraft.

It is an additional object of the invention to provide a novel system for controlling aircraft flaps by accepting total head pressure and static pressure and applying the differences therebetween to an electrical circuit, and utilizing the electrical signal thereby generated to actuate drive means for the aircraft flaps.

A further object of the invention is the provision of an improved system for varying the angle of aircraft flaps, which system is characterized by a condition of balance and which is adapted in response to aircraft speeds above or below a predetermined speed range to assume a condition of unbalance which effects energization of flap drive means, said condition of unbalance being returned to a condition of balance by follow-up means connected to and operated by the flaps.

It is yet another object of the invention to provide a unique flap control system which includes automatic means responsive to aircraft speed for effecting changes in flap angle, and which includes means for manually varying the flap angle in the event of malfunction of the automatic means.

Another object of the invention resides in the provision of an improved flap control system for effecting a change in the balance of an electrical circuit as a function of the airspeed of the aircraft, said control system including flap drive means adapted for driving the aircraft flaps up or down in response to unbalance in the electrical circuit above or below a balanced condition determined by a predetermined speed range of the aircraft.

Figure 2:
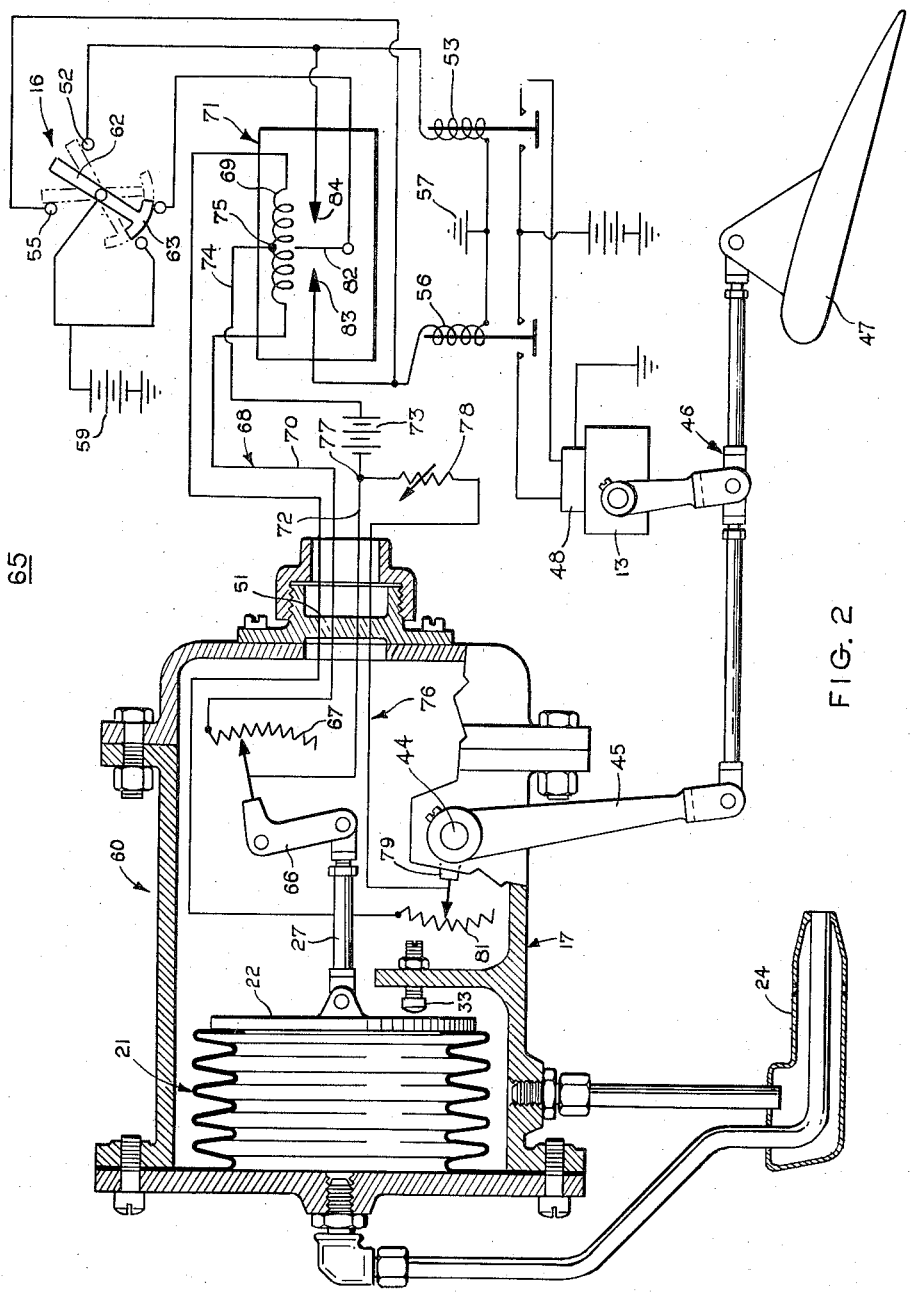

Other objects and features of the present invention will be readily apparent to those skilled in the art from the following specification and appended drawings wherein is illustrated a preferred form of the invention, and in which:

Figure 1 is an illustration of a preferred embodiment of the control system of the present invention, certain portions thereof being shown diagrammatically, and certain other portions thereof being shown in cross section; and Figure 2 is an illustration of a second embodiment of the control system, certain portions thereof being shown diagrammatically and certain other portions thereof being shown in cross section.

Referring to the drawings and more particularly to Figure 1, there is illustrated a preferred embodiment of the invention which is adapted for converting differences between static pressures and the pressures developed during flight of an aircraft, for example, into a mechanical displacement which is utilized to complete one or the other of two electrical circuits in accordance with the direction of the mechanical displacement. As will be seen, energization of one or the other of these two electrical circuits causes actuation of a motor in a direction corresponding to the direction of such displacement to thereby move the aircraft flaps either up or down.

More specifically, the present control system, designated in its entirety by the numeral 11, comprises generally an airspeed responsive control, mechanism, or regulator 12 which serves to actuate a flap drive means or motor 13 in a first direction or a second direction by completing, respectively, an electrical circuit generally designated 14, or an electrical circuit generally designated 15, as will be more particularly described hereinafter. A manual switch 16 is provided for selective use with either circuit 14 or circuit 15, in accordance with the desire of the operator and regardless of the dictates of regulator 12 whereby regulator 12 may be circumvented by the operator or pilot in the event of malfunction of regulator 12.

Regulator 12 includes an outer housing or casing 17 which is provided with end portions 18 and 19 suitably connected at the ends of casing 17 to provide a fluid type chamber within outer casing 17. Disposed within the chamber formed by casing 17 is a bellows or expansible member 21 which is affixed at one end to end portion 18 as illustrated, and which is provided at its other end with an end wall 22 whereby within expansible member 21 there is formed a chamber 23 which is sealed off from the interior of outer casing 17.

As is well known, a pressure differences acting against end wall 22 from both inside and outside chamber 23 effect an expansion or contraction of expansible member 21. In the present control system 11, member 21 is caused to expand or contract by the difference in pressure which is accepted by a usual and conventional Pitot tube 24, which is applied to member 21 through a pair of pressure lines 25 and 26. Pitot tube 24 is situated in the air stream external of the aircraft and, as is well known, is sensitive to both ram pressure and static pressure, static pressure being transmitted through pressure line 25 to the inner side of end wall 22, while ram or total head pressure is transmitted through pressure line 26 to the inner side of end wall 22, suitable openings being provided in outer casing 17 to permit the transmission of pressure therethrough from lines 25 and 26.

Assuming the airspeed of the aircraft is greater than a certain predetermined airspeed, end wall 22 will be urged to the right, this movement of end wall 22 being transmitted by an adjustable link 27 to a pivotal elbow or contact member 28, which link 27 is connected at one end to end wall 22 and at the other end to elbow member 28. Member 28 in turn is pivotally mounted upon a shaft 29 which is rigidly fixed at its ends to casing 17, whereby member 28 pivots in a counterclockwise direction upon expansion of expansible member 21, and carries upwardly an upper contact 31 and a lower contact 32 which are both insulatably secured to contact member 28 and electrically connected together. It is noted that movement of 22 to the right is prevented beyond a predetermined point by an adjustable stop member 33 which is suitably mounted upon a boss 34 which is integral with outer casing 17. In this manner expansible member 21 is protected from injurious over-expansion.

Upon expansion of expansible member 21, as above described, the upward movement of the right end of contact member 28 brings contact 31 into electrical engagement with a contact 35 which is insulatably mounted to a generally fork-shaped element 36. This completes an electrical circuit which effects movement of the flap in an "up" direction, as will be more particularly described hereinafter. Movement of the flap in a "down" direction is similarly effected by a contraction of expansible member 21, which contraction causes movement of end wall 22 to the left thereby causing movement of lower contact 32 downwardly into electrical contact with a contact 37 which, like contact 35, is insulatably mounted to forkshaped element 36.

Element 36 is pivotally mounted upon shaft 29 in adjacent relationship with contact member 28, and is provided with a lower arm 38 which carries an adjustable cam follower 39 whose purpose is to adjust the pivoted position of element 36 by slidably cooperating with a cam segment 41. Cam follower 39 is urged into contact with cam segment 41 by the bias of a spring 42 which is mounted at one end to outer casing 17 and at its other end to an upper arm 43 of bifurcated element 36.

It will be apparent that, by means of the construction thus far described, contact member 28 may be adjustably relatively positioned as desired by adjusting the length of link 27, and also by adjusting the position of cam follower 39 to thereby position element 36 in a desired pivoted position relative to member 28. In this manner the gap between contacts 31 and 35, and between contacts 32 and 37 may be controlled, and an adjustment made of the extent of movement of contact member 28 and element 36 required to effect engagement of such contacts.

Cam segment 41 is fixedly connected to a shaft 44 which is rotatably disposed through the sides of outer casing 17, suitable packing being provided about shaft 44 to prevent fluid leakage into or out of casing 17. At one protruding end of shaft 44 there is rigidly secured a follow-up member at arm 45 which is connected to a follow-up system or linkage mechanism 46 which is operatively connected to drive airplane flap 47. But one flap 47 is illustrated, it being understood that this is merely representative of the flaps utilized by the aircraft which are operatively interconnected in well known manner for common movement. It is also to be understood that the precise form of linkage mechanism 46 forms no part of the present invention, any linkage means being satisfactory which serves to provide an interconnection between arm 45 and the airplane flap 47 to move arm 45 in correspondence with any movement of airplane flap 47. Further, the linkage means should be adapted, as is linkage 46, for connection to drive motor 13 so that drive motor 13 may drive linkage mechanism 46 in one direction or the other in accordance with the dictates of control system 11. In the preferred embodiment herein described, a solenoid 48 is employed, being operatively associated with a drive motor 13 of the hydraulic type and actuated under the control of electrical circuit 14 or 15, as the case may be. It will be readily apparent that electrical drive means could be utilized instead of hydraulic motor 13, if desired, it being important only that the particular drive means be adapted for driving linkage mechanism 46 in one direction or the other as desired.

Circuit 14, which is utilized in moving flaps 47 downwardly, includes an electrical lead 49 which is connected at one end to lower contact 32, and is brought out of casing 17 through any suitable airtight fitting 51, as illustrated. Lead 49 is electrically interconnected at its other end to a "down" switch contact 52 and to the coil or winding of a "down" relay 53.

Similarly, an electrical lead 54, which is connected to contact 35, is brought out of casing 17 through fitting 51 and is interconnected to "up" switch contact 55 and to the winding of an "up" relay 56. Further, the windings of relays 53 and 56 are electrically connected through a common ground 57. Thus, upon energization of down relay 53, the switch member thereof will complete an electrical interconnection between a source of potential 58 to the solenoid 48 and then to ground whereby solenoid 48 causes drive motor 13 to operate in a "first" direction to move airplane flap 47 downwardly. Likewise, upon energization of the winding of up relay 56, the switch member thereof will effect electrical connection between the source of potential 58 and solenoid 48 whereby solenoid 48 will cause operation of drive motor 13 in a "second" direction to move airplane flap 47 upwardly.

A source of potential 59 for energizing relays 53 and 56 is connected at one end to a suitable ground 61, and interconnected at its other end to a switch member 62, suitably mounted for pivotal movement, and also to a contact segment 63 integral with switch member 62. Segment 63 of member 62 is in turn normally electrically connected to upper contact 31 and lower contact 32 within casing 17 by a lead 64. It will be apparent that clockwise pivotal movement of switch member 62, which is normally biased to the position illustrated, will bring switch member 62 into engagement with switch contact 52 and will also bring contact segment 63 out of electrical connection with potential source 59 and lead 64, as indicated in phantom outline and, similarly, pivotal movement of switch member 62 and segment 63 in a counter clockwise direction will bring switch member 62 into engagement with up switch contact 55. Thus, potential 59 normally is effective to energize down relay 53 or up relay 56 regardless of the position of switch member 62, although it will be evident that if for some reason the automatic action of regulator 12 fails, manual movement of switch member 62 into engagement with either switch contact 52 or switch contact 55 will achieve the desired purpose by interconnecting potential 59 with the appropriate relay.

Operation of control system 11 to effect extension or downward movement of aircraft flap 47 is caused by a reduction of the speed of the aircraft beyond a certain predetermined landing speed. Expansible member 21 senses such airspeed condition by contracting under the reduced ram air pressure, and this contraction effects engagement between lower contact 32 and contact 37 to complete the circuit from potential 59 to down relay 53 whereby drive motor 13 is actuated in a first direction to bring aircraft flap 47 down. Downward movement of flap 47 continues until its movement, through follow-up linkage 46, arm 45, and cam segment 41, causes pivotal downward movement of bifurcated element 36 in an amount sufficient to disengage lower contact 32 and contact 37. It will be evident that if the airspeed decreases, this cycle of operation will be repeated, balanced by the follow-up system 46, and repeated as necessary until the aircraft has come to a standstill.

Operation of control system 11 upon take-off is initiated by the increasing ram pressure of the airstream, effecting movement of end wall 22 to the right and causing engagement between upper contact 31 and contact 35. This completes circuit 15 whereby potential 59 energizes up relay 56, causing drive motor 13 to operate in a "second" direction to retract or move flaps 47 upwardly. Upward movement of flaps 47, through follow-up system 46, causes element 36 to pivot upwardly, separating upper contact 31 and contact 35 and thereby stopping further raising of flaps 47 until the airspeed again increases sufficiently to bring upper contact 31 and contact 35 into engagement. The cycle is repeated, balanced by the follow-up system 46, and repeated as necessary until flaps 47 have been completely retracted at some predetermined flying speed.

A second embodiment of the present invention, generally designated 65, is illustrated in Figure 2, various of the components of this second embodiment being similar to the various components of control system 11 just described. Where the construction of the components of the two systems is substantially identical, the components of system 65 will be assigned numerals corresponding to the like components of system 11.

Control system 65 comprises generally a regulator 60 having an outer casing 17 which houses an expansible member 21, the expansible movement of which is limited by an adjustable stop member 33. A Pitot tube 24 is provided to apply static and total head pressure to expansible member 21 and the interior of outer casing 17.

Movement of the end wall 22 of expansible member 21 is transmitted through link 27 to a pivotally mounted contact member 66, which is diagrammatically indicated as being operative upon a resistor 67 for varying the resistance in a circuit, generally designated 68. A lead 70 of circuit 68 is led through airtight fitting 51 and is connected at one end to resistor 67, and at the other end to circuit balancing means, such as to a coil 69 of a conventional polarized relay 71. A lead 72 of circuit 68 electrically interconnects contact member 66, through airtight fitting 51, to a source of potential 73, and from potential 73 a lead 74 is electrically connected to a center point or tap 75 or coil 69. It is seen that with this construction an electrical circuit 68 is completed from resistor 67, through coil 69, to contact member 66, and that movement of contact member 66 serves to vary the magnitude of current in this circuit 68 by varying the effective resistance of resistor 67 in such circuit. Circuit 68 forms, in effect, one side of a Wheatstone bridge, while an electrical circuit 76 serves as the other half of the bridge circuit.

Circuit 76 is connected at 77 to circuit 68, and includes a variable resistor 78 which may be adjusted to effect a predetermined normal condition of balance in the Wheatstone bridge arrangement. Variable resistor 78 is electrically connected to a pivotable arm 79 which is rigidly mounted upon a shaft 44, and pivotable arm 79, as indicated diagrammatically, is operative upon a variable resistance 81 whereby upon pivotable movement of arm 79 the amount of effective resistance of resistance 81 in circuit 76 is altered to thereby change the magnitude of current flow therethrough. Pivotable arm 79 is operatively connected to flaps 47 through follow-up arm 45 and the follow-up system 46 which was previously described in connection with the preferred embodiment of the present invention. From resistance 81 circuit 76 is electrically connected to the coil 69 of polarized relay 71.

Polarized relay 71 serves to effect an electrical balance between circuits 68 and 76, as is well known to those skilled in the art, by actuating a pivotally mounted switch arm 82 in one direction or the other, depending upon which of circuits 68 and 76, that is, which side of the Wheatstone bridge circuit, is carrying current at that time. Thus, assuming the effective resistance of resistor 67, is less than the effective resistance of resistance 81, a current will flow in circuit 68, energizing coil 69 and pivoting switch arm 82 to the left into engagement with an "up" contact 83. Similarly, if the effective resistance of resistance 81 were less than that of resistor 67, coil 69 would be energized to bring switch arm 82 to the right into engagement with a "down" contact 84.

The engagement between switch arm 82 and down contact 84 serves to complete a circuit from a source of potential 59, through contact segment 63 to the coil of "down" relay 53 and thence to ground 57. Energization of down relay 53 in turn completes a circuit to solenoid 48 whereby drive motor 13 is driven in a "first" direction to move airplane flap 47 downwardly. Likewise, engagement of switch arm 82 with up contact 83 achieves energization of "up" relay 56, and consequently actuation of drive motor 13 in a "second" direction whereby flaps 47 are raised.

Manual switch 62 is provided, as in the preferred embodiment, to permit the pilot or operator to raise to raise or lower flaps 47 manually in the event of malfunctioning of regulator 60 or the electrical circuits associated therewith. Thus, pivotal movement of switch member 62 into engagement with contact 52 serves to move flaps 47 downwardly, and movement of switch member 62 to the left into engagement with up switch contact 55 will achieve a raising of flaps 47.

The operation of control system 65 will next be described. Upon landing, the airspeed of the aircraft will gradually be reduced effecting a reduction in total head pressure and causing a movement of end wall 22 to the left. This movement of wall 22 causes a corresponding clockwise movement of 67, increasing the resistance in circuit 68 whereby current will flow through electrical circuit 76 to energize coil 69 and bring switch arm 82 into engagement with down contact 84 whereby flap 47 is lowered. The downward movement of flaps 47 is transmitted through follow-up system 46 to pivotable arm 79, moving arm 79 counterclockwise and increasing the resistance in electrical circuit 76 until a condition of balance occurs in the Wheatstone bridge arrangement to disengage switch arm 82 from down contact 84. As the speed of the aircraft is further reduced, it will be apparent that the bridge circuit will again be thrown out of balance, lowering flaps 47 until a condition of balance is again assumed. The cycle is repeated as necessary until the aircraft has come to a standstill.

During take-off, assuming the flaps are fully extended or down, the increasing pressures produced by the increasing airspeeds will expand member 21 to pivot contact member 66 to effect a reduction in the effective resistance of resistor 67 in circuit 68. This causes switch arm 82 to engage up contact 83 and bring the flaps up. It is noted that the amount of effective resistance produced by an increment of pivotal movement of member 66 may be adjusted, if desired, by utilizing a form of variable resistor whose resistance is not increased or decreased in direct proportion to equal increments of movement of contact member 66, but instead whose resistance is variable as some desired function of the movement of contact member 66. That is, for example, the winding of resistor 67 may be made such that initial counterclockwise movement of contact member 66 will not substantially reduce the effective resistance in circuit 68 but for each further increment of pivotal movement of member 66 the effective resistance will be increased as some desired function of the movement of member 66. In this manner, flaps 47 are not raised appreciably at low take-off speeds and are raised somewhat more rapidly as the normal flying speed of the aircraft is approached.

As the flaps 47 are raised during the take-off condition, upward movement of flaps 47, through follow-up system 46, rotates pivotable arm 79 in a clockwise direction to thereby reduce the effective resistance of resistor 81 in circuit 76, eventually achieving a condition of balance in the Wheatstone bridge arrangement. This cycle of balance and unbalance is repeated until flaps 47 are completely raised at the normal flying speed of the aircraft.

In the embodiments above described, it will be obvious that a flap control system has been provided which is adapted to automatically translate changes in airspeed to changes in flap angle.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A system for controlling aircraft surfaces which comprises a first displaceable means comprising a switching member for making and breaking electric circuits, an airspeed responsive device adapted to displace said switching member in accordance with changes in airspeed, a second displaceable means carrying spaced apart contact elements adapted to be separately engaged by said switching member to make and break electric circuits therethrough, means for effecting movement of an aircraft surface upwardly and downwardly, said means including a motor having electrical interconnections with said spaced contact elements and operable to move said aircraft surfaces when said switching member engages one or the other of said spaced apart contact elements, and follow-up means having an operative connection with said aircraft surface and adapted to move said second displaceable means in accordance with movement of said aircraft surface whereby movement of said aircraft surface tends to counterbalance the displacement of said switching member, said follow-up means including means operative upon said second displaceable means to establish the movement of said aircraft surface as a predetermined and readily alterable function of the movement of said first displaceable means.

2. A system for controlling aircraft surfaces which comprises means for effecting movement of an aircraft surface upwardly and downwardly, said means including a motor control means responsive to current magnitude variations and having electrical interconnections with said motor for controlling the operations thereof, a first current varying means electrically connected to said control means, a second current varying means electrically connected to said control means, said first current varying means including a first movable member, an airspeed responsive device mechanically connected to said first movable member to move said first movable member in accordance with changes in airspeed, said second current varying means including a second movable member, and mechanical linkage means connecting said aircraft surface to said second movable member to permit movement of said second movable member relative to said first movable member in accordance with movement of said aircraft surface whereby movement of said second movable member tends to counterbalance the movement of said first movable member.

3. A system for controlling aircraft surfaces which comprises means for effecting movement of an aircraft surface upwardly and downwardly, said means including a motor control means interconnected to a motor and responsive to control signals for controlling the operations of said motor, a first control signal producing means electrically connected to said control means, a second control signal producing means actuable for producing control signals corresponding to positions of said aircraft surface, said second control signal producing means being interconnected with said control means in opposition to said first signal producing means, said first signal producing means including a first movable member, an airspeed responsive device mechanically connected to said first movable member to move said first movable member in accordance with changes in airspeed, and mechanical linkage means connecting said aircraft surface to said second movable member to permit movement of said second movable member relative to said first movable member in accordance with movement of said aircraft surface whereby said second control signal producing means tends to generate signals opposing the signals of said first control signal producing means.

4. A system for controlling aircraft surfaces which comprises a first movable element, a pressure responsive device arranged to be subjected to total head and static pressures encountered during movement of the aircraft and adapted to displace said first movable element in increments of displacement proportional to the difference between the total head and static pressures, first means controllable by displacement of said first movable element to effect movement of an aircraft surface, said first means including an actuating motor having an operative connection with said aircraft surface and manually operable means for actuating said motor independently of said first displaceable means, a second movable element cooperative with said first movable element for the control of said actuating motor, and second means adapted to displace said second movable element corresponding to movements of said aircraft surface whereby the movements of said aircraft surfrace tend to oppose the displacement of said first movable element, said first means including means operative to establish the movement of said aircraft surface as a predetermined non-linear function of the displacing effect of said pressure responsive device.

5. A system for controlling aircraft surfaces which is characterized by a condition of balance and a condition of unbalance, said system comprising an airspeed sensing device, a first displaceable means, means coupling said airspeed sensing device to said first displaceable means whereby said first displaceable means may be automatically moved in response to changes in airspeed to effect a condition of unbalance in said system, a second displaceable means, drive means for moving an aircraft surface, electrical means under the control of said first displaceable means for automatically actuating said drive means when said system is in a condition of unbalance, adjusting means coupled to said aircraft surface and operative upon said second displaceable means to provide correspondence of movement therebetween, and manually operable means for actuating said drive means independently of said first displaceable means.

6. A system for controlling aircraft surfaces comprising first and second displaceable contact means normally maintained in spaced relationship, a source of voltage interconnected with said first displaceable contact means, airspeed responsive means operatively associated with said first displaceable contact means for effecting engagement between said first and second contact means whereby signals are produced, linkage means operatively interconnecting an aircraft surface and said second displaceable contact means for adjusting the relative spacing of said first and second contact means in accordance with positions of said aircraft surface, and control means responsive to signals produced on engagement of said first and second contact means for effecting movement of said aircraft surface, said control means including a motor having an operative connection with said aircraft surface, said linkage means including means operative upon said second displaceable contact means and adapted for establishing the movement of said aircraft surface as a predetermined function of the movement of said first displaceable contact means.

7. A system for controlling aircraft surfaces comprising first and second displaceable contact means normally maintained in spaced relationship, a source of voltage interconnected with said first displaceable contact means, airspeed responsive means operatively associated with said first displaceable contact means for effecting engagement between said first and second contact means whereby signals are produced, linkage means operatively interconnecting an aircraft surface and said second displaceable contact means for adjusting the relative spacing of said first and second contact means in accordance with positions of said aircraft surface, control means responsive to signals produced on engagement of said first and second contact means for effecting movement of said aircraft surface, said control means including a motor having an operative connection with said aircraft surface and manually operable electrical control means for actuating said motor independently of said first and second contact means.

8. A system for controlling aircraft surfaces comprising first pivotal contact means, second pivotal contact means, said first pivotal contact means and said second pivotal contact means being normally maintained in spaced relationship, a source of voltage interconnected with said first pivotal contact means, airspeed responsive means operatively associated with said first pivotal contact means for effecting engagement between said first pivotal contact means and said second pivotal contact means whereby signals are produced, linkage means operatively interconnecting an aircraft surface and said second pivotal contact means, said linkage means comprising a pivoted cam member having a slidable engagement with said second pivotal contact means for adjusting the relative spacing of said first pivotal contact means and said second pivotal contact means in accordance with positions of said aircraft surface, control means responsive to signals produced on engagement of said first pivotal contact means and said second pivotal contact means for effecting movement of said aircraft surface, said control means including a motor having an operative connection with said aircraft surface.

9. A system for controlling aircraft surfaces which comprises a first displaceable means, an airspeed responsive device arranged to be subjected to total head and static pressures encountered during movement of the aircraft and adapted to displace said first displaceable means in accordance with changes in said pressures, drive means for moving an aircraft surface, actuating means actuable by displacement of said first displaceable means to effect operation of said drive means to effect movement of said aircraft surface, a second displaceable means operatively associated with said actuating means, and follow-up means having an operative connection with said aircraft surface and said second displaceable means and thereby adapted to effect displacement of said second displaceable means in accordance with movement of said aircraft surface whereby movement of said aircraft surface tends to counterbalance the displacement of said first displaceable means, said actuating means including means operative to establish the movement of said aircraft surface as a predetermined function of the displacement of said first displaceable means.

10. A system for controlling aircraft surfaces which comprises a first displaceable means for controlling flow of current in an electrical circuit, an airspeed responsive device arranged to be subjected to total head and static pressures encountered during movement of the aircraft and adapted to displace said first displaceable means in accordance with changes in said pressures, a motor in said electrical circuit, linkage means connecting said motor to said aircraft surface, actuating means actuable by displacement of said first displaceable means to effect operation of said motor to effect movement of said aircraft surface, a second displaceable means operatively connected with said actuating means, follow-up means having an operative connection with said aircraft surface and said second displaceable means and thereby adapted to effect displacement of said second displaceable means in accordance with movement of said aircraft surface whereby movement of said aircraft surface tends to counterbalance the displacement of said first displaceable means, and manually operable means for actuating said motor independently of said first displaceable means.

References Cited in the file of this patent

UNITED STATES PATENTS

| | | |
|---|---|---|
| 2,067,953 | Spence | Jan. 19, 1937 |
| 2,137,974 | Fishel | Nov. 22, 1938 |
| 2,232,982 | Tank | Feb. 25, 1941 |
| 2,387,795 | Isserstedt | Oct. 30, 1945 |
| 2,426,508 | Isserstedt | Aug. 26, 1947 |